(12) United States Patent
Bhagavathiperumal et al.

(10) Patent No.: US 9,479,349 B2
(45) Date of Patent: Oct. 25, 2016

(54) VLAG PIM MULTICAST TRAFFIC LOAD BALANCING

(71) Applicant: Lenovo Enterprise Solutions (Singapore) Pte. Ltd., Singapore (SG)

(72) Inventors: Chidambaram Bhagavathiperumal, Santa Clara, CA (US); Angu S. Chandra Sekaran, Santa Clara, CA (US); Naveen C. Sekhara, Milpitas, CA (US); Ashok K. Somosundaram, Santa Clara, CA (US)

(73) Assignee: LENOVO ENTERPRISE SOLUTIONS (SINGAPORE) PTE. LTD, Singapore (SG)

( * ) Notice: Subject to any disclaimer, the term of this patent is extended or adjusted under 35 U.S.C. 154(b) by 397 days.

(21) Appl. No.: 14/144,879

(22) Filed: Dec. 31, 2013

(65) Prior Publication Data

US 2015/0188722 A1    Jul. 2, 2015

(51) Int. Cl.
*H04L 12/18* (2006.01)
*H04L 12/803* (2013.01)
*H04L 12/709* (2013.01)
*H04L 12/743* (2013.01)
*H04L 12/761* (2013.01)

(52) U.S. Cl.
CPC ......... *H04L 12/1886* (2013.01); *H04L 45/16* (2013.01); *H04L 45/245* (2013.01); *H04L 45/7453* (2013.01); *H04L 47/125* (2013.01); *Y02B 60/33* (2013.01)

(58) Field of Classification Search
CPC . H04L 45/22; H04L 12/1886; H04L 47/125; H04L 45/245; H04L 45/7453; H04L 41/0668; H04L 41/0654

USPC ....... 370/219, 235, 236, 244, 254, 255, 390, 370/392; 455/414.1
See application file for complete search history.

(56) References Cited

U.S. PATENT DOCUMENTS

| 7,719,958 | B1 | 5/2010 | Azimi et al. | |
|---|---|---|---|---|
| 2006/0019641 | A1* | 1/2006 | Vayanos | H04L 12/1881 455/414.1 |
| 2012/0033668 | A1 | 2/2012 | Humphries | |
| 2012/0163162 | A1 | 6/2012 | Zhang | |
| 2012/0188909 | A1 | 7/2012 | Previdi et al. | |
| 2013/0182581 | A1* | 7/2013 | Yeung | H04L 12/1877 370/244 |
| 2013/0329727 | A1* | 12/2013 | Rajagopalan | H04L 12/4641 370/390 |
| 2014/0198661 | A1* | 7/2014 | Raman | H04L 47/125 370/236 |

* cited by examiner

*Primary Examiner* — Charles C Jiang
*Assistant Examiner* — Wali Butt
(74) *Attorney, Agent, or Firm* — Katherine S. Brown; Andrew M. Calderon; Roberts Mlotkowski Safran, Cole & Calderon, P.C.

(57) ABSTRACT

A PIM vLAG network load balancing system includes a first vLAG switch and a second vLAG switch each connected to, and receive data traffic from, an upstream network device. The first and second vLAG switches balance network data traffic by both determining a source IP address and a multicast group address associated with the received data traffic, hashing the addresses, combining the hashed addresses to determine a resultant value, and either dropping or transmitting the received data traffic to a downstream network device based upon the resultant value. The first vLAG switch may transmit and the second vLAG switch may drop the received data traffic if the resultant value is a first binary value. The second vLAG switch may transmit and the first vLAG switch may drop the received data traffic if the resultant value is a second binary value.

20 Claims, 3 Drawing Sheets

VLAG PIM MULTICAST TRAFFIC LOAD BALANCING

FIELD

Embodiments of invention generally relate to networking and network systems, and more particularly to virtual link aggregation group (vLAG) Protocol Independent Multicast (PIM) data traffic load balancing.

DESCRIPTION OF THE RELATED ART

PIM is a group of multicast routing protocols for Internet Protocol (IP) networks that supports one-to-many and many-to-many data distribution over a LAN, WAN, Internet, etc. PIM does not include its own topology discovery mechanism, but instead uses routing information supplied by other traditional routing protocols such as Open Shortest Path First, Intermediate System to Intermediate System, Routing Information Protocol and Border Gateway Protocol, etc. There are four variants of PIM. A particular variant, PIM Dense Mode (PIM-DM), uses dense multicast routing and builds shortest-path trees by flooding multicast traffic domain wide, and reduces branches of the tree where no receivers are present.

One basic premise of PIM-DM is that a multicast packet flow has receivers at most locations. Therefore, PIM-DM is ideal for groups where many of the nodes will subscribe to receive multicast packets. In PIM-DM the source initially broadcasts to every node directly connected to it. The neighboring nodes further forward the data to it's neighbors. When a node does not wish to receive a particular node's or group of node's data, it sends a Prune message to indicate its lack of interest. Upon receiving a Prune message, the node will modify its state so that it will not forward those packets out to that node or group of nodes.

Further, in many data center environments or networks, downstream servers or switches connect to upstream devices which consolidate traffic. A switch in the data center environment or network access layer may be connected to more than one switch in the data center environment or network aggregation layer in order to provide for network redundancy. The Spanning Tree Protocol (STP) may be used to prevent broadcast loops, blocking redundant link paths. However, this has the unwanted consequence of reducing the available bandwidth between the layers. In addition, STP may be slow to resolve topology changes that occur during a link failure, and can result in considerable MAC address flooding.

Using Virtual Link Aggregation Groups (vLAGs), the redundant links remain active, utilizing all available bandwidth. Using vLAGs, paired vLAG peers appear as a single virtual entity for the purpose of establishing a multi-port trunk. vLAG capable switches synchronize their logical view of the access layer port structure and internally prevent implicit loops. The vLAG topology also responds to link failure and improves unnecessary MAC flooding. vLAGs are also useful in multi-layer environments for both link and downlink redundancy to any regular link aggregation group device.

In traditional vLAG PIM topologies that include a primary vLAG switch and a secondary vLAG switch within a vLAG peer group, only the primary vLAG switch will forward data traffic to a downstream network receiver. The secondary vLAG switch will receive the data traffic but will drop the packet to avoid duplicate traffic to the receiver. These topologies overload the primary vLAG switch as the dedicated forwarder of data traffic regardless of number of upstream network sources and downstream network receiver. The overloading of the primary vLAG switch impacts switch performance and limits overall data throughput in vLAG network topologies.

SUMMARY

In a first embodiment of the present invention, a system for PIM vLAG network load balancing includes a first vLAG switch connected to an upstream network device by a first link and a second vLAG switch connected to the upstream network device by a second link and connected to the first vLAG switch by an ISL. In order to balance network data traffic loads received from the upstream network device, both the first vLAG switch and the second vLAG switch are configured to: determine a source IP address and a multicast group address associated with the received data traffic, hash the source IP address and the multicast group address, combine the hashed source IP address and the hashed multicast group address to determine a resultant value, and transmit the received data traffic to a downstream network device or drop the data traffic based upon the resultant value.

In certain embodiments, the first vLAG switch transmits the received data traffic to the downstream network device and the second vLAG switch drops the received data traffic if the resultant value is a first binary value. In certain embodiments, the second vLAG switch transmits the received data traffic to the downstream network device and the first vLAG switch drops the received data traffic if the resultant value is a second binary value.

In another embodiment of the present invention, a method for PIM vLAG network load balancing includes: receiving, with the first vLAG switch and the second vLAG switch, data traffic from the upstream network device, determining, with the first vLAG switch and the second vLAG switch, the source IP address and a multicast group address associated with the received data traffic; hashing, with the first vLAG switch and the second vLAG switch, the source IP address and the multicast group address; combining, with the first vLAG switch and the second vLAG switch, the hashed source IP address and the hashed multicast group address to determine a resultant value, and transmitting, with the first vLAG switch or the second vLAG switch, the received data traffic to a downstream network device based upon the resultant value.

In yet another embodiment of the present invention, a computer program product for PIM vLAG network load balancing includes a computer readable storage medium having program code embodied therewith that is executable to: receive, with the first vLAG switch and the second vLAG switch, data traffic from the upstream network device, determine, with the first vLAG switch and the second vLAG switch, the source IP address and the multicast group address associated with the received data traffic, hash, with the first vLAG switch and the second vLAG switch, the source IP address and the multicast group address, combine, with the first vLAG switch and the second vLAG switch, the hashed source IP address and the hashed multicast group address to determine the resultant value, and transmit, with the first vLAG switch or the second vLAG switch, the received data traffic to the downstream network device based upon the resultant value.

These and other embodiments, features, aspects, and advantages will become better understood with reference to the following description, appended claims, and accompanying drawings.

BRIEF DESCRIPTION OF THE DRAWINGS

So that the manner in which the above recited features of the present invention are attained and can be understood in detail, a more particular description of the invention, briefly summarized above, may be had by reference to the embodiments thereof which are illustrated in the appended drawings.

It is to be noted, however, that the appended drawings illustrate only typical embodiments of this invention and are therefore not to be considered limiting of its scope, for the invention may admit to other equally effective embodiments.

DETAILED DESCRIPTION

Figure 1:
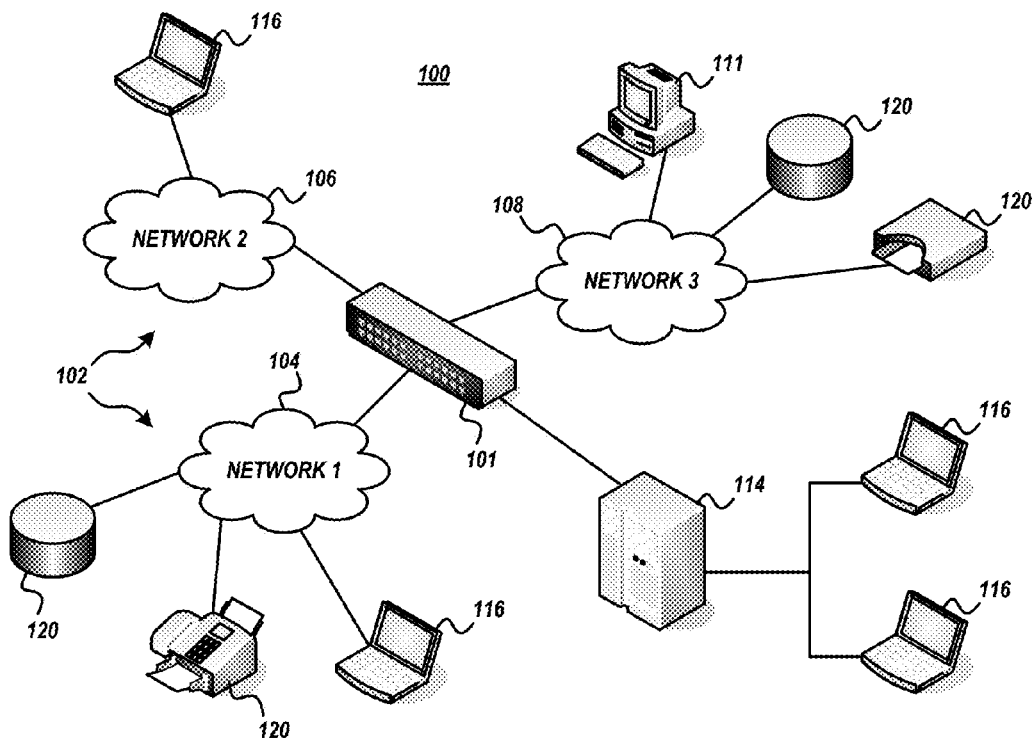
FIG. 1 depicts a network architecture, according to various embodiments of the present invention.

Details of the claimed embodiments are disclosed herein. However, it is understood that the disclosed embodiments are merely illustrative of the structures, devices, systems, methods, etc. that may be embodied in various forms. These exemplary embodiments are provided so that this disclosure will be thorough and complete and will convey the scope of this invention to those skilled in the art. In the description, details of well-known features and techniques may be omitted to avoid unnecessarily obscuring the presented embodiments.

Accordingly, aspects of the present invention may take the form of an entirely hardware embodiment, an entirely software embodiment (including firmware, resident software, micro-code, etc.) or an embodiment combining software and hardware aspects that may all generally be referred to herein as a "circuit," "module" or "system." Furthermore, aspects of the present invention may take the form of a computer program product embodied in one or more computer readable medium(s) having computer readable program code embodied thereon. Any combination of one or more computer readable medium(s) may be utilized.

The computer readable medium may be a computer readable signal medium or a computer readable storage medium. A computer readable storage medium may be, for example, but not limited to, an electronic, magnetic, optical, electromagnetic, infrared, or semiconductor system, apparatus, or device, or any suitable combination of the foregoing. More specific examples (a non-exhaustive list) of the computer readable storage medium would include the following: a portable computer diskette, a hard disk, a random access memory (RAM), a read-only memory (ROM), an erasable programmable read-only memory (EPROM or Flash memory), a portable compact disc read-only memory (CD-ROM), an optical storage device, a magnetic storage device, or any suitable combination of the foregoing. In the context of this document, a computer readable storage medium may be any tangible medium that can contain, or store a program for use by or in connection with an instruction execution system, apparatus, or device.

A computer readable signal medium may include a propagated data signal with computer readable program code embodied therein, for example, in baseband or as part of a carrier wave. Such a propagated signal may take any of a variety of forms, including, but not limited to, electromagnetic, optical, or any suitable combination thereof. A computer readable signal medium may be any computer readable medium that is not a computer readable storage medium and that can communicate, propagate, or transport a program for use by or in connection with an instruction execution system, apparatus, or device.

Program code embodied on a computer readable medium may be transmitted using any appropriate medium, including but not limited to wireless, wireline, optical fiber cable, RF, etc., or any suitable combination of the foregoing.

Computer program code for carrying out operations for aspects of the present invention may be written in any combination of one or more programming languages, including an object oriented programming language such as Java, Smalltalk, C++ or the like and conventional procedural programming languages, such as the "C" programming language or similar programming languages. The program code may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider).

Aspects of the present invention are described below with reference to flowchart illustrations and/or block diagrams of methods, apparatus (systems) and computer program products according to embodiments of the invention. It will be understood that each block of the flowchart illustrations and/or block diagrams, and combinations of blocks in the flowchart illustrations and/or block diagrams, can be implemented by computer program instructions. These computer program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer program instructions may also be stored in a computer readable medium that can direct a computer, other programmable data processing apparatus, or other devices to function in a particular manner, such that the instructions stored in the computer readable medium produce an article of manufacture including instructions which implement the function/act specified in the flowchart and/or block diagram block or blocks.

The computer program instructions may also be loaded onto a computer, other programmable data processing apparatus, or other devices to cause a series of operational steps to be performed on the computer, other programmable apparatus or other devices to produce a computer implemented process such that the instructions which execute on the computer or other programmable apparatus provide processes for implementing the functions/acts specified in the flowchart and/or block diagram block or blocks.

FIG. 1 illustrates a network architecture 100, in accordance with various embodiments. As shown in FIG. 1, a plurality of remote networks 102 are provided including a first remote network 104 and a second remote network 106. A gateway 101 may be coupled between the remote networks 102 and a proximate network 108. In the context of the present network architecture 100, the networks 104, 106 may each take any form including, but not limited to a LAN, a WAN such as the Internet, public switched telephone network (PSTN), internal telephone network, etc.

In use, the gateway 101 serves as an entrance point from the remote networks 102 to the proximate network 108. As such, the gateway 101 may function as a router, which is capable of directing a given packet of data that arrives at the gateway 101, and a switch, which furnishes the actual path in and out of the gateway 101 for a given packet.

Further included is at least one data server 114 coupled to the proximate network 108, and which is accessible from the remote networks 102 via the gateway 101. It should be noted that the data server(s) 114 may include any type of computing device/groupware. Coupled to each data server 114 is a plurality of user devices 116. Such user devices 116 may include a desktop computer, laptop computer, handheld computer, printer, and/or any other type of logic-containing device. It should be noted that a user device 111 may also be directly coupled to any of the networks, in some embodiments.

A peripheral 120 or series of peripherals 120, e.g., facsimile machines, printers, scanners, hard disk drives, networked and/or local storage units or systems, etc., may be coupled to one or more of the networks 104, 106, 108. It should be noted that databases and/or additional components may be utilized with, or integrated into, any type of network element coupled to the networks 104, 106, 108. In the context of the present description, a network element may refer to any component of a network.

According to some approaches, methods and systems described herein may be implemented with and/or on virtual systems and/or systems which emulate one or more other systems, such as a UNIX system which emulates an IBM z/OS environment, a UNIX system which virtually hosts a MICROSOFT WINDOWS environment, a MICROSOFT WINDOWS system which emulates an IBM z/OS environment, etc. This virtualization and/or emulation may be enhanced through the use of VMWARE software, in some embodiments.

In more approaches, one or more networks 104, 106, 108, may represent a cluster of systems commonly referred to as a "cloud." In cloud computing, shared resources, such as processing power, peripherals, software, data, servers, etc., are provided to any system in the cloud in an on-demand relationship, thereby allowing access and distribution of services across many computing systems. Cloud computing typically involves an Internet connection between the systems operating in the cloud, but other techniques of connecting the systems may also be used, as known in the art.

Figure 2:
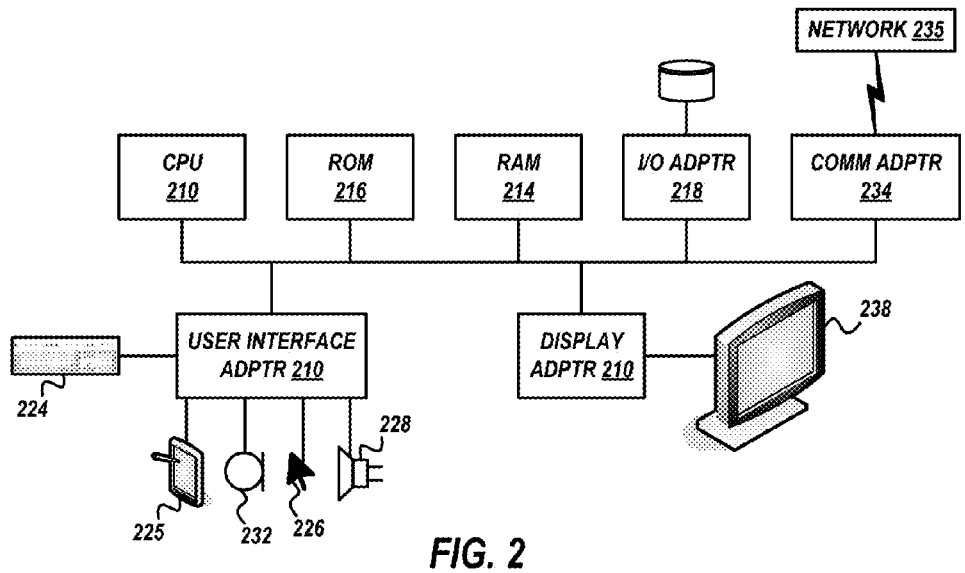
FIG. 2 depicts an exemplary data handling system associated with one or more of the network devices depicted in FIG. 1, according to various embodiments of the present invention.

FIG. 2 shows an exemplary data handling system associated with a user device 116 and/or server 114 of FIG. 1, in accordance with one embodiment. FIG. 2 illustrates a representative data handling system having a central processing unit (CPU) 210, such as a microprocessor, and a number of other units interconnected via one or more buses 212 which may be of different types, such as a local bus, a parallel bus, a serial bus, etc., according to several embodiments.

The data handling system in FIG. 2 may include a Random Access Memory (RAM) 214, Read Only Memory (ROM) 216, an I/O adapter 218 for connecting peripheral devices such as disk storage units 220 to the one or more buses 212, a user interface adapter 222 for connecting a keyboard 224, a mouse 226, a speaker 228, a microphone 232, and/or other user interface devices such as a touch screen 225, a digital camera (not shown), etc., to the one or more buses 212, communication adapter 234 for connecting the workstation to a communication network 235 (e.g., a data processing network) and a display adapter 236 for connecting the one or more buses 212 to a display device 238.

The workstation may have resident thereon an operating system such as the MICROSOFT WINDOWS Operating System (OS), a MAC OS, a UNIX OS, etc. It will be appreciated that a preferred embodiment may also be implemented on platforms and operating systems other than those mentioned. A preferred embodiment may be written using JAVA, XML; C, and/or C++ language, or other programming languages, along with an object oriented programming methodology. Object oriented programming (OOP), which has become increasingly used to develop complex applications, may be used.

Figure 3:
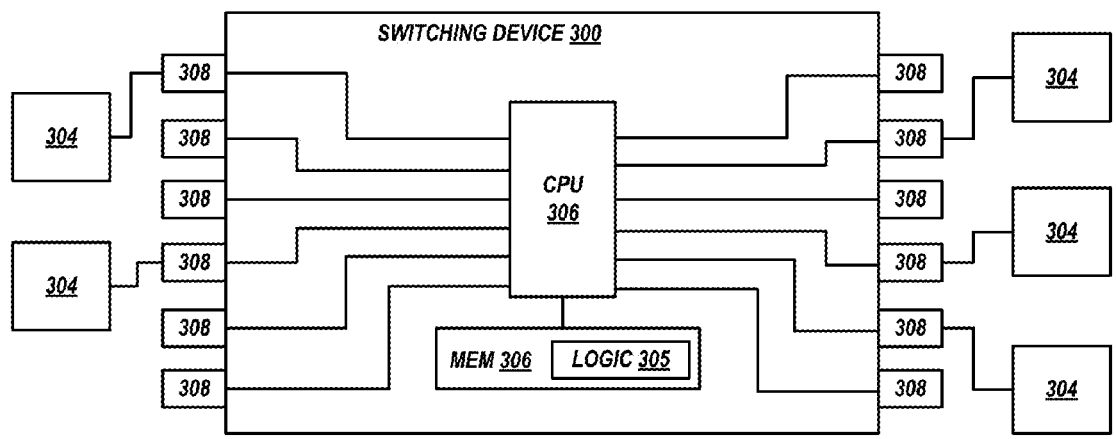
FIG. 3 depicts an exemplary switching device, according to various embodiments of the present invention.

Referring now to FIG. 3, a switching device 300 is shown according to one embodiment. As shown, the switching device 300 comprises one or more processors 306, such as a dynamic host configuration protocol (DHCP) server processor, adapted for assigning and managing device addresses for devices 304 (e.g. servers 114, user devices 116, and/or peripherals 120, etc.) electrically connected to the switching system 300, switching processor, etc. In certain embodiments, a single processor 306 is configured to carry out the functionality of switching device 300. Any type of processor known in the art may be used such as a central processing unit (CPU), a field programmable gate array (FPGA), an integrated circuit (IC), an application specific integrated circuit (ASIC), etc. A device addresses may comprise media access control (MAC) addresses, IP addresses, and/or any other type of device address known in the art.

Processor 306 includes an arithmetic logic unit (ALU), which performs arithmetic and logical operations, and a control unit, which extracts instructions (e.g. logic 305, software, code, program, etc.) from memory 306 and decodes and executes the instructions, calling on the ALU when required. Memory 306 may be any known storage device that allows for data to be stored and accessed by processor 306. Memory 306 may be RAM (e.g. SRAM, ROM, OTP, NOR flash, etc.), SRAM, DRAM or other such equivalents used in association with processor 306.

The processor 306 includes or has access to logic 305 configured for detecting one or more multicast routers, switches, etc. connected to one or more ports coupled to the processor 306. As will be understood by one having ordinary skill in the art upon reading the present descriptions, any detection method may be utilized to determine any multicast router, switch, etc. connected to one or more ports coupled to the switching processor 306, in various approaches.

In additional embodiments, the processor 306 includes or has access to logic 305 configured for receiving at least one data packet. In one particular embodiment, the at least one packet may be received by a packet switching ASIC from a source. The processor 306 also includes or has access to logic 305 configured for forwarding at least one packet (unicast, multicast, etc.) to at least one destination. In one particular embodiment, the at least one packet may be forwarded by the packet switching ASIC. Of course, the at least one packet may also be received/forwarded in any location and in any manner suitable for the presently described networking environment, as would be understood by one having ordinary skill in the art upon reading the present descriptions. In order to forward packets, processor 306 may also include or have access to logic 305 for determining the best available route or path for packet routing or transmission.

In additional embodiments, the processor 306 includes or has access to logic 305 configured for transmitting the at least one packet to the at least one destination. As will be understood by one having ordinary skill in the art upon reading the present descriptions, the at least one packet (unicast, multicast, etc.) may be sent in any suitable manner as would be understood by one having ordinary skill in the art upon reading the present descriptions. Furthermore, the sending or transmission method may vary depending on the capabilities and configuration of the particular networking environment through which the packet is traversing, etc.

In still more embodiments, the processor 306 includes or has access to logic 305 configured for creating a unicast and/or multicast route entry. While much of the present description may relate to creating a route entry in a Multicast Communications (MC) table, it should be understood that any embodiments described herein may be directed to other or specific routing protocols, routing protocol tables, etc. As such, the switching processor may includes or has access to logic 305 configured for creating a unicast and or multicast route entry in an IPMC table, MC table, etc. In some approaches, the MC table may be installed, for example, to processor 306.

Still further, a processor 306a in a first switching device 300a may further include or has access to logic 305 configured to determine if a packet received from an upstream network device should be transmitted to a downstream network device or whether the received packet should not be transmitted to the downstream network device.

Still further, the processor 306 further includes or has access to logic 305 configured to hash one or more network device and/or device group addresses. For example, processor 306 may hash an IP address of a source network device and/or a multicast group address associated with a receiving network device, etc. Generally, processor 106 may implement hash logic upon the one or more network addresses to generate fixed-length output data that acts as a shortened reference to the one or more network addresses hashed. Still further, the processor 306 further includes or has access to logic 305 configured to combine the hashed source IP address and the hashed multicast group address and to utilize the combined hashed addresses to determine whether the packet received from an upstream network device should be transmitted to the downstream network device.

Figure 4:
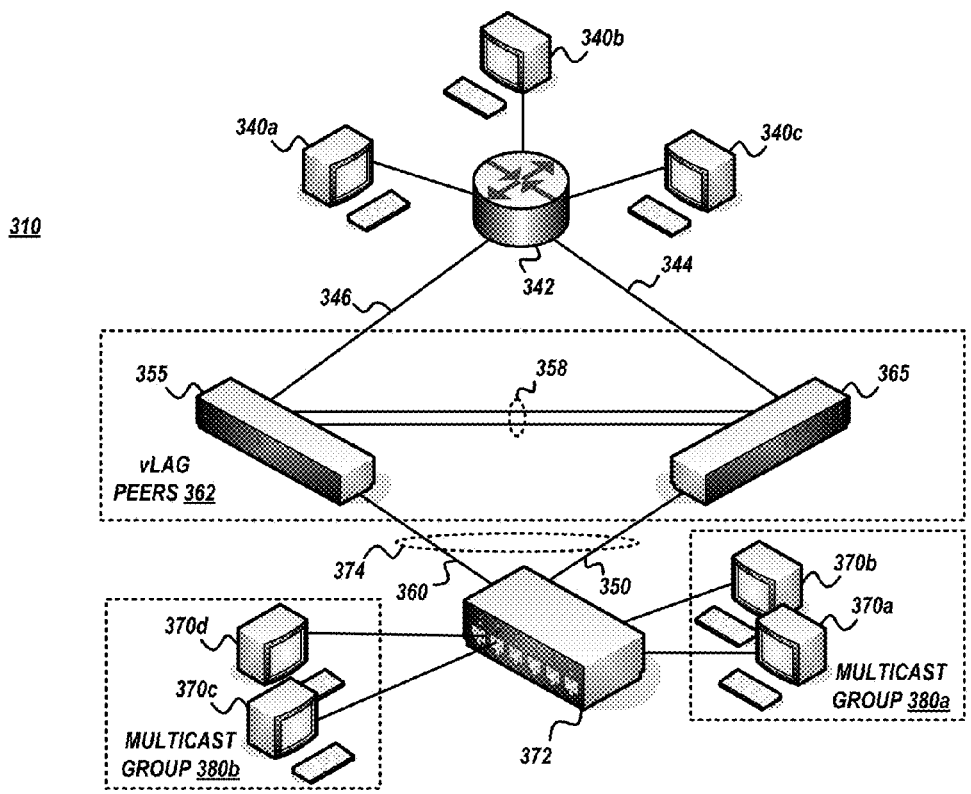
FIG. 4 depicts an exemplary network switching architecture, according to various embodiments of the present invention.

FIG. 4 depicts an exemplary network switching architecture 310, according to various embodiments of the present invention. Network switching architecture 310 includes one or more sources 340, a plurality of vLAG switches 355, 364 that form at least one vLAG peer group 362, and one or more receivers 370. In certain implementations network switching architecture 310 may also include an upstream network device such as a multicast router 342, a downstream network device such as an access switch 372, and/or other network devices or components. In certain embodiments, source 340 and receiver 370 may be e.g. a server 114, a user device 116, and/or a peripheral 120, etc.

In various embodiments, one or more downstream network devices, such as receivers 370, etc. may be included in a multicast group 380 wherein each of the downstream network devices within the multicast group 380 share a multicast group address. Further, in various embodiments, upstream network devices, such as sources 340 may each have a unique source IP address associated therewith.

vLAG switches 355, 364 may be vLAG configured switching devices 300, respectively, that form a vLAG peer group 362 that appear as a single virtual entity. In certain embodiments, vLAG peer group 362 appear as a single virtual entity to downstream network devices only. vLAG switches 355, 364 within a vLAG peer group 362 may synchronize a logical view of combined physical vLAG switches 355, 364 ports and may internally manage and prevent implicit data traffic loops. A vLAG 374 connection consists of multiple ports of vLAG peers, which are connected by link 360, link 350, respectively to a downstream logical client device such as a server, switch (e.g. access switch 372, etc.), or another vLAG device. The vLAG 374 connection allows the vLAG peer group 362 to logically appear as a single virtual entity to the downstream network device.

vLAG switches 355, 364 each include one or more ISL ports dedicated for vLAG peer group 362 connection and are interconnected by a dedicated inter-switch link (ISL) 358. The ISL ports used to create the ISL 358 may have the following properties: the ISL ports may be assigned or dedicated to a similar virtual LAN; the ISL ports may have active vLAN tagging; the ISL ports may be placed into a regular port trunk group. In certain implementations, two ports on each vLAG switch 355, 364 are assigned for ISL 358.

vLAG switches 355, 364 provide one or more data paths for communicating data from the source 340 to the receiver 370, or visa versa. For example, vLAG switch 355 and vLAG switch 365 may be connected to multicast router 342 via link 346 and link 344, respectively. Multicast router 342 may be connected to source 340 as is known in the art. Further for example, vLAG switch 355 and vLAG switch 365 may be connected to access switch via vLAG connection 374. Access switch 372 may be connected to receiver 370 as is known in the art.

In certain embodiments, vLAG switch 355 may be a primary vLAG switch and vLAG switch 365 may be a secondary vLAG switch within vLAG peer group 362.

In traditional vLAG PIM topologies, only the primary vLAG switch will forward data traffic to the receiver. Though the secondary vLAG switch will receive the data traffic, it drops the data traffic to avoid duplicate traffic to the receiver. These traditional topologies overload the primary vLAG switch since the primary vLAG switch is always the forwarder regardless of number of multicast sources and receivers present. This will affect the performance of the primary switch and limits the throughput of the network.

Therefore, according to various embodiments of the present invention, the load of the primary vLAG switch is reduced by designating the secondary vLAG switch to transmit some of data traffic received from an upstream network device to a downstream network device. For example, as shown in the vLAG architecture of FIG. 4, PIM is enabled on primary vLAG switch 355, secondary vLAG switch 365, and an upstream network device, such as an upstream multicast router 342. On reception of multicast data traffic from the upstream network device, both primary vLAG switch 355 and secondary vLAG switch 365 create an associated multicast route entry, respectively. The local multicast route entry in the primary vLAG switch 355 will designate the incoming interface link 346 as the link point towards the upstream network device. The local multicast route entry in the secondary vLAG switch 365 will designate the incoming interface link 344 as the link point towards the upstream network device.

To determine whether the primary vLAG switch 355 or whether the secondary vLAG switch 365 will transmit data traffic received from the upstream network device to the downstream network device, both the primary vLAG switch 355 and the secondary vLAG switch 365 hash the source IP address associated with the received data traffic and hash the multicast group address associated with the data traffic destination. Both the primary vLAG switch 355 and the secondary vLAG switch 365 may combine the hashed source IP address and the hashed multicast group address and to utilize the combined hashed addresses to determine whether the packet received from an upstream network device should be transmitted to the downstream network device. For example, if the combined hashed address result in an even or zero value result, primary vLAG switch 355 may transmit the traffic received from the upstream network device to the downstream network device and if the combined hashed address result in an odd value result, secondary vLAG switch 365 may transmit the traffic received from the upstream network device to the downstream network device.

In certain vLAG PIM topologies, the hashed source IP address and the hashed multicast group address load balancing scheme herein described is advantageous since multiple network parameters, e.g. data traffic source and data traffic destination, etc. are used to balance data traffic loads across multiple vLAG switches to e.g. increase throughput of multicast routing.

Figure 5:
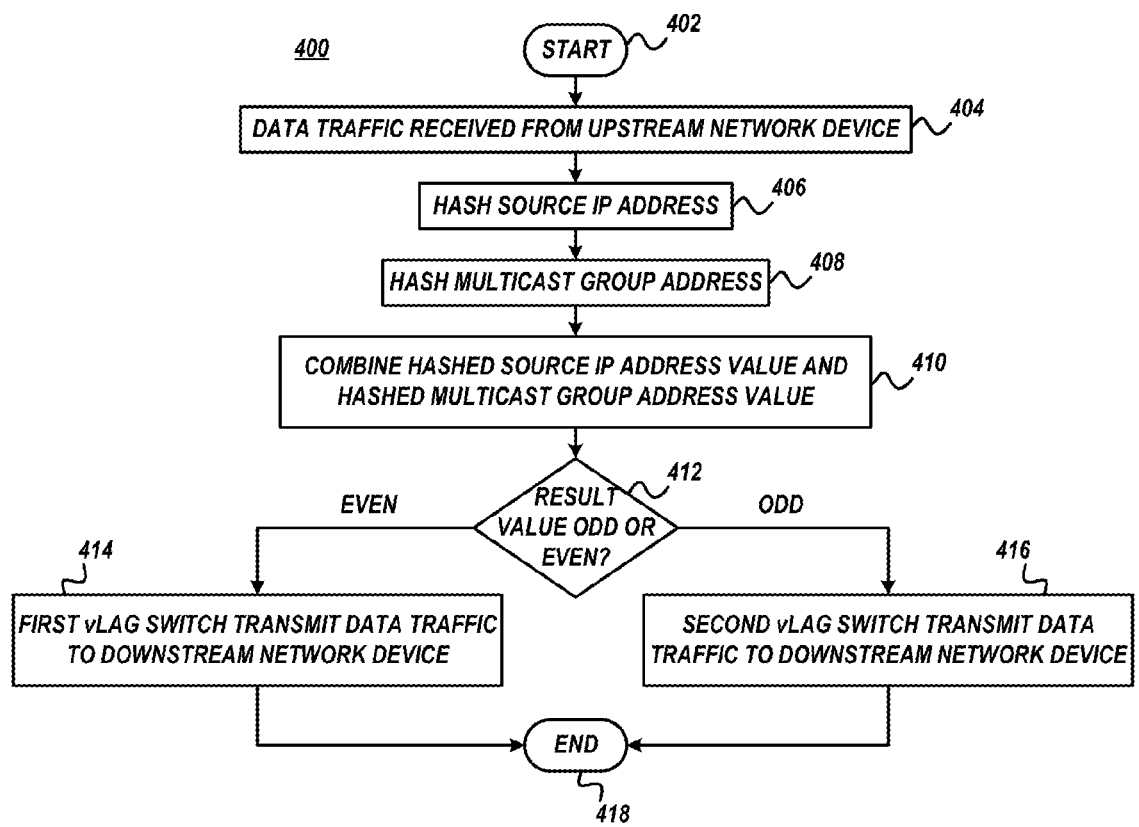
FIG. 5 depicts a flow diagram of an exemplary vLAG PIM load balancing process, according to various embodiments of the present invention.

FIG. 5 depicts a flow diagram of an exemplary vLAG PIM load balancing process 400, according to various embodiments of the present invention. Process 400 begins at block 402 and continues with data traffic being received by both primary vLAG switch 355 and secondary vLAG switch 365 from an upstream network device (block 404). For example, primary vLAG switch 355 receives one or more multicast data packets from multicast router 342. The one or more multicast data packets may originate or otherwise be transmitted to the multicast router by one or more sources 340. In certain implementations, the one or more sources 340 may transmit the one or more multicast packets directly to both primary vLAG switch 355 and secondary vLAG switch 365. The received data traffic may include a data portion and an address portion. The data portion may be functional or otherwise useful information and the address portion may identify the source and/or destination of the data traffic. In certain embodiments, the address portion comprises a source IP address and a multicast group address. For example, the address portion may include the IP address of a particular source 340c and/or multicast group address of a particular multicast group 380b.

In certain embodiments, upon the receipt of the data traffic both the primary vLAG switch 355 and secondary vLAG switch 365 create an associated multicast route entry or entries within an MC table. For example, primary vLAG switch 355 creates a multicast route entry in an IPMC table comprised within primary vLAG switch 355 and secondary vLAG switch 365 creates a multicast route entry in an IPMC table comprised within secondary vLAG switch 365.

Process 400 continues with both primary vLAG switch 355 and secondary vLAG switch 365 hashing the source IP address respectively (block 406). In various embodiments, primary vLAG switch 355 and secondary vLAG switch 365 may implement a trivial hash function, a perfect hash function, a rolling hash function, locality-sensitive hash function, or other known hashing technique. In a particular embodiment, the primary vLAG switch 355 and secondary vLAG switch 365 hash the source IP address with shift XOR logic. Particularly, the source IP address may be hashed as follows: ((Source IP Address (Left-shift by) 24) XOR ((Source IP Address (Left-shift by) 16) XOR ((Source IP Address (Left-shift by) 8) XOR (Source IP Address). For example, the source IP address may be 12.1.1.1. The source IP address may be represented as 0x12010101 and the exemplary Hashed Source IP Address Value is therefore ((00000012) XOR (00001201) XOR (00120101) XOR (12010101)) and is equal to 0x12131213.

Process 400 continues with both primary vLAG switch 355 and secondary vLAG switch 365 hashing the source IP address respectively (block 408). In various embodiments, primary vLAG switch 355 and secondary vLAG switch 365 may implement a similar hash function to hash the multicast group address. In a particular embodiment, the primary vLAG switch 355 and secondary vLAG switch 365 hash the multicast group address with shift XOR logic. Particularly, the multicast group address may be hashed as follows: ((Multicast Group Address (Left-shift by) 24) XOR ((Multicast Group Address (Left-shift by) 16) XOR ((Multicast Group Address (Left-shift by) 8) XOR (Multicast Group Address). For example, the multicast group address may be 225.1.1.1. The source IP address may be represented as 0xFF010101 and the exemplary Hashed Multicast Group Address Value is therefore ((000000FF) XOR (0000FF01) XOR (00FF0101) XOR (FF010101)) and is equal to 0xFFFEFFFE.

Process 400 continues with both primary vLAG switch 355 and secondary vLAG switch 365 combining the Hashed Source IP Address Value and the Hashed Multicast Group Address Value (block 410). For example, both primary vLAG switch 355 and secondary vLAG switch 365 may combine the Hashed Source IP Address Value and the Hashed Multicast Group Address Value to create a Resultant Value as follows: ((Hashed Source IP Address Value)+(Hashed Multicast Group Address Value)) MOD 2.

In certain embodiments, the Hashed Source IP Address Value and the Hashed Multicast Group Address Value may be combined by e.g. adding the Hashed Source IP Address Value and the Hashed Multicast Group Address Value, etc. The Resultant Value may be determined by the primary vLAG switch 355 and secondary vLAG switch 365 implementing a remainder operation to determine a remainder of the combined Hashed Source IP Address Value and the Hashed Multicast Group Address Value. In certain embodiments, the remainder operation determines the remainder of the combined Hashed Source IP Address Value and the Hashed Multicast Group Address Value when divided by 2. If there is no remainder the Resultant Value is 0. If there is a reminder, the Resultant Value is 1.

Continuing the example presented above, the particular Hashed Source IP Address Value Resulting Value (0x12131213) is combined with the particular Hashed Multicast Group Address Value (0xFFFEFFFE). Subsequent to performing a MOD 2 remainder operation on the combination, the Resultant Value is determined to be 1.

Process 400 continues by both the primary vLAG switch 355 and secondary vLAG switch 365 determining if the Resultant Value is odd or even (block 412). In certain embodiments, if the Resultant Value is 0 the combined Hashed Source IP Address Value and the Hashed Multicast Group Address Value is EVEN and if the Resultant Value is 1 the combined Hashed Source IP Address Value and the Hashed Multicast Group Address Value is ODD.

Process 400 continues with the primary vLAG switch 355 transmitting the received data traffic from the upstream network device to a downstream network device if the Resultant Value is EVEN (block 414). For example, if the Resultant Value is EVEN, primary vLAG switch 355 transmits the received one or more multicast data packets from multicast router 342 to access switch 372. In certain embodiments, if the Resultant Value is EVEN, the secondary vLAG switch 365 drops the received one or more multicast data packets since it has been determined it is the responsibility of the primary vLAG switch 355 to transmit the data traffic to the downstream network device.

Process 400 continues with the secondary vLAG switch 365 transmitting the received data traffic from the upstream network device to a downstream network device if the Resultant Value is ODD (block 416). For example, if the Resultant Value is ODD, secondary vLAG switch 365 transmits the received one or more multicast data packets from multicast router 342 to access switch 372. Process 400 ends a block 418. In certain embodiments, if the Resultant Value is ODD, the primary vLAG switch 355 drops the received one or more multicast data packets since it has been determined it is the responsibility of the secondary vLAG switch 365 to transmit the data traffic to the downstream network device.

The drawings may be merely schematic representations, not intended to portray specific parameters of the invention. The drawings are intended to depict only exemplary embodiments of the invention. In the drawings, like numbering represents like elements.

The accompanying figures and this description depicted and described embodiments of the present invention, and features and components thereof. Those skilled in the art will appreciate that any particular nomenclature used in this description was merely for convenience, and thus the invention should not be limited by the specific process identified and/or implied by such nomenclature. Therefore, it is desired that the embodiments described herein be considered in all respects as illustrative, not restrictive, and that reference be made to the appended claims for determining the scope of the invention.

The flowchart and block diagrams in the figures illustrate the architecture, functionality, and operation of possible implementations of systems, methods and computer program products according to various embodiments of the present invention. In this regard, each block in the flowchart or block diagrams may represent a module, segment, or portion of code, which comprises one or more executable instructions for implementing the specified logical function(s). It should also be noted that, in some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts, or combinations of special purpose hardware and computer instructions.

The invention claimed is:

1. A system for Protocol Independent Multicast (PIM) virtual link aggregation group (vLAG) network load balancing, the system comprising:
   a first vLAG switch connected to an upstream network device by a first link;
   a second vLAG switch connected to the upstream network device by a second link and connected to the first vLAG switch by an inter-switch link (ISL),
   wherein to load balance network data traffic received from the upstream network device, the first vLAG switch and the second vLAG switch are configured to:
      determine a source internet protocol (IP) address and a multicast group address associated with the received data traffic;
      hash the source IP address and the multicast group address;
      combine the hashed source IP address and the hashed multicast group address to determine a resultant value;
      determine if the resultant value is an odd value or an even value; and
   transmit the received data traffic to a downstream network device with one of the first vLAG and the second vLAG and drop the data traffic with the other one of the first vLAG and the second vLAG based upon whether the resultant value is an odd value or an even value.

2. The system of claim 1, wherein the first vLAG switch transmits the received data traffic to the downstream network device and the second vLAG switch drops the received data traffic if the resultant value is an even value.

3. The system of claim 2, wherein the second vLAG switch transmits the received data traffic to the downstream network device and the first vLAG switch drops the received data traffic if the resultant value is an odd value.

4. The system of claim 1, wherein the first vLAG switch and the second vLAG switch are further configured to:
   create a multicast route entry within a local multicast communications table.

5. The system of claim 1, wherein the first vLAG switch and the second vLAG switch hash the source IP address and the multicast group address utilizing a shift XOR hash function.

6. The system of claim 1 wherein the upstream network device is a multicast router.

7. The system of claim 1, wherein the first vLAG switch and the second vLAG switch are connected to the downstream networking device by a vLAG connection.

8. The system of claim 7, wherein the first vLAG switch and the second vLAG switch appear via the vLAG connection as a single logical device to the downstream networking device.

9. A method for Protocol Independent Multicast (PIM) virtual link aggregation group (vLAG) network load balancing, the method comprising:
   receiving, with a first vLAG switch and a second vLAG switch, data traffic from an upstream network device;
   determining, with the first vLAG switch and the second vLAG switch, a source internet protocol (IP) address and a multicast group address associated with the received data traffic;
   hashing, with the first vLAG switch and the second vLAG switch, the source IP address and the multicast group address;

combining, with the first vLAG switch and the second vLAG switch, the hashed source IP address and the hashed multicast group address to determine a resultant value;

determine, with the first vLAG switch and the second vLAG switch, if the resultant value is an odd value or an even value; and transmitting, with the first vLAG switch or the second vLAG switch, the received data traffic to a downstream network device based upon whether the resultant value is an odd value or an even value.

10. The method of claim 9, wherein transmitting the received data traffic to the downstream network device based upon the resultant value further comprises:

transmitting, with the first vLAG switch, the received data traffic to the downstream network device if the resultant value is the even value, and;

dropping, with the second vLAG switch, the received data traffic if the resultant value is the even value.

11. The method of claim 10, wherein transmitting, with the first vLAG switch or the second vLAG switch, the received data traffic to the downstream network device based upon the resultant value further comprises:

transmitting, with the second vLAG switch, the received data traffic to the downstream network device if the resultant value is the odd value, and;

dropping, with the first vLAG switch, the received data traffic if the resultant value is the odd value.

12. The method of claim 9 further comprising:

creating, with the first vLAG switch and the second vLAG switch, a multicast route entry within a local multicast communications table.

13. The method of claim 9, wherein hashing the source IP address and the multicast group address further comprises:

hashing, with the first vLAG switch and second vLAG switch, the source IP address and the multicast group address utilizing a shift XOR hash function.

14. The method of claim 9 wherein the upstream network device is a multicast router, wherein the first vLAG switch and the second vLAG switch are connected to the downstream networking device by a vLAG connection, and wherein the first vLAG switch and the second vLAG switch appear via the vLAG connection as a single logical device to the downstream networking device.

15. A computer program product for Protocol Independent Multicast (PIM) virtual link aggregation group (vLAG) network load balancing, the computer program product comprising a hardware computer readable storage device having program code embodied therewith, the program code executable to:

receive, with a first vLAG switch and a second vLAG switch, data traffic from an upstream network device;

determine, with the first vLAG switch and the second vLAG switch, a source internet protocol (IP) address and a multicast group address associated with the received data traffic;

hash, with the first vLAG switch and the second vLAG switch, the source IP address and the multicast group address;

combine, with the first vLAG switch and the second vLAG switch, the hashed source IP address and the hashed multicast group address to determine a resultant value;

determine, with the first vLAG switch and the second vLAG switch, if the resultant value is an odd value or an even value; and transmit, with the first vLAG switch or the second vLAG switch, the received data traffic to a downstream network device based upon whether the resultant value the resultant value is an odd value or an even value.

16. The computer program product of claim 15, wherein the program code for transmitting the received data traffic to the downstream network device based upon the resultant value is further executable to:

transmit, with the first vLAG switch, the received data traffic to the downstream network device if the resultant value is the even value, and;

drop, with the second vLAG switch, the received data traffic if the resultant value is the even value.

17. The computer program product of claim 16, wherein transmitting the received data traffic to the downstream network device based upon the resultant value is further executable to:

transmit, with the second vLAG switch, the received data traffic to the downstream network device if the resultant value is the odd value, and;

drop, with the first vLAG switch, the received data traffic if the resultant value the odd value.

18. The computer program product of claim 15 wherein the program code is further executable to:

create, with the first vLAG switch and the second vLAG switch, a multicast route entry within a local multicast communications table.

19. The computer program product of claim 15, wherein the program code for hashing the source IP address and the multicast group address is further executable to:

hash, with the first vLAG switch and second vLAG switch, the source IP address and the multicast group address utilizing a shift XOR hash function.

20. The computer program product of claim 15 wherein the upstream network device is a multicast router, wherein the first vLAG switch and the second vLAG switch are connected to the downstream networking device by a vLAG connection, and wherein the first vLAG switch and the second vLAG switch appear via the vLAG connection as a single logical device to the downstream networking device.

* * * * *